(12) United States Patent
Wray et al.

(10) Patent No.: US 12,143,064 B2
(45) Date of Patent: Nov. 12, 2024

(54) JUMPER MODULE WITH SLEEVE

(71) Applicant: GAF Energy LLC, Parsippany, NJ (US)

(72) Inventors: Evan Michael Wray, Cotati, CA (US); Henry Pham, San Jose, CA (US); Lewis Abra, San Francisco, CA (US); Hasib Amin, Parisppany, NJ (US)

(73) Assignee: GAF Energy LLC, Parsippany, NJ (US)

( * ) Notice: Subject to any disclaimer, the term of this patent is extended or adjusted under 35 U.S.C. 154(b) by 0 days.

(21) Appl. No.: 18/475,891

(22) Filed: Sep. 27, 2023

(65) Prior Publication Data

US 2024/0113658 A1    Apr. 4, 2024

Related U.S. Application Data

(60) Provisional application No. 63/411,269, filed on Sep. 29, 2022.

(51) Int. Cl.
  *H02S 40/36*  (2014.01)
  *H02S 20/23*  (2014.01)
  *H02S 40/34*  (2014.01)

(52) U.S. Cl.
  CPC .............. *H02S 40/36* (2014.12); *H02S 20/23* (2014.12); *H02S 40/34* (2014.12)

(58) Field of Classification Search
  None
  See application file for complete search history.

(56) References Cited

U.S. PATENT DOCUMENTS

| | | | |
|---|---|---|---|
| 1,981,467 | A | 11/1934 | Radtke |
| 3,156,497 | A | 11/1964 | Lessard |
| 3,581,779 | A | 6/1971 | Gilbert, Jr. |
| 4,258,948 | A | 3/1981 | Hoffmann |
| 4,349,220 | A | 9/1982 | Carroll et al. |
| 4,499,702 | A | 2/1985 | Turner |

(Continued)

FOREIGN PATENT DOCUMENTS

| | | |
|---|---|---|
| CA | 2829440 A | 5/2019 |
| CH | 700095 A2 | 6/2010 |

(Continued)

OTHER PUBLICATIONS

Sunflare, Procducts: "Sunflare Develops Prototype for New Residential Solar Shingles"; 2019 << sunflaresolar.com/news/sunflare-develops-prototype-for-new-residential-solar-shingles>> retrieved Feb. 2, 2021.

(Continued)

*Primary Examiner* — Eli S Mekhlin
(74) *Attorney, Agent, or Firm* — GREENBERG TRAURIG, LLP

(57) ABSTRACT

A system includes a plurality of photovoltaic modules installed on a roof deck and arranged in an array, and at least one jumper module electrically connecting a first subarray and a second subarray of the array. The jumper module includes a first end and a second end, a sleeve extending from the first end to the second end, and at least one electrical cable. The sleeve is sized and shaped to receive the at least one electrical cable. The at least one electrical cable electrically connects the first subarray to the second subarray.

18 Claims, 7 Drawing Sheets

(56) References Cited

U.S. PATENT DOCUMENTS

| | | |
|---|---|---|
| 4,636,577 A | 1/1987 | Peterpaul |
| 5,167,579 A | 12/1992 | Rotter |
| 5,437,735 A | 8/1995 | Younan et al. |
| 5,590,495 A | 1/1997 | Bressler et al. |
| 5,642,596 A | 7/1997 | Waddington |
| 6,008,450 A | 12/1999 | Ohtsuka et al. |
| 6,033,270 A | 3/2000 | Stuart |
| 6,046,399 A | 4/2000 | Kapner |
| 6,201,180 B1 * | 3/2001 | Meyer .................... H02S 20/23 52/173.3 |
| 6,220,329 B1 | 4/2001 | King et al. |
| 6,308,482 B1 | 10/2001 | Strait |
| 6,320,114 B1 | 11/2001 | Kuechler |
| 6,320,115 B1 | 11/2001 | Kataoka et al. |
| 6,336,304 B1 | 1/2002 | Mimura et al. |
| 6,341,454 B1 | 1/2002 | Koleoglou |
| 6,407,329 B1 | 6/2002 | Iino et al. |
| 6,576,830 B2 | 6/2003 | Nagao et al. |
| 6,928,781 B2 | 8/2005 | Desbois et al. |
| 6,972,367 B2 | 12/2005 | Federspiel et al. |
| 7,138,578 B2 | 11/2006 | Komamine |
| 7,155,870 B2 | 1/2007 | Almy |
| 7,178,295 B2 | 2/2007 | Dinwoodie |
| 7,487,771 B1 | 2/2009 | Eiffert et al. |
| 7,587,864 B2 | 9/2009 | McCaskill et al. |
| 7,678,990 B2 | 3/2010 | McCaskill et al. |
| 7,678,991 B2 | 3/2010 | McCaskill et al. |
| 7,748,191 B2 | 7/2010 | Podirsky |
| 7,819,114 B2 | 10/2010 | Augenbraun et al. |
| 7,824,191 B1 | 11/2010 | Podirsky |
| 7,832,176 B2 | 11/2010 | McCaskill et al. |
| 8,118,109 B1 | 2/2012 | Hacker |
| 8,168,880 B2 | 5/2012 | Jacobs et al. |
| 8,173,889 B2 | 5/2012 | Kalkanoglu et al. |
| 8,210,570 B1 | 7/2012 | Nagle |
| 8,276,329 B2 | 10/2012 | Lenox |
| 8,312,693 B2 | 11/2012 | Cappelli |
| 8,319,093 B2 | 11/2012 | Kalkanoglu et al. |
| 8,333,040 B2 | 12/2012 | Shiao et al. |
| 8,371,076 B2 | 2/2013 | Jones et al. |
| 8,375,653 B2 | 2/2013 | Shiao et al. |
| 8,404,967 B2 | 3/2013 | Kalkanoglu et al. |
| 8,410,349 B2 | 4/2013 | Kalkanoglu et al. |
| 8,418,415 B2 | 4/2013 | Shiao et al. |
| 8,438,796 B2 | 5/2013 | Shiao et al. |
| 8,468,754 B2 | 6/2013 | Railkar et al. |
| 8,468,757 B2 | 6/2013 | Krause et al. |
| 8,505,249 B2 | 8/2013 | Geary |
| 8,512,866 B2 | 8/2013 | Taylor |
| 8,513,517 B2 | 8/2013 | Kalkanoglu et al. |
| 8,586,856 B2 | 11/2013 | Kalkanoglu et al. |
| 8,601,754 B2 | 12/2013 | Jenkins et al. |
| 8,629,578 B2 | 1/2014 | Kurs et al. |
| 8,646,228 B2 | 2/2014 | Jenkins |
| 8,656,657 B2 | 2/2014 | Livsey et al. |
| 8,671,630 B2 | 3/2014 | Lena et al. |
| 8,677,702 B2 | 3/2014 | Jenkins |
| 8,695,289 B2 | 4/2014 | Koch et al. |
| 8,713,858 B1 | 5/2014 | Xie |
| 8,713,860 B2 | 5/2014 | Railkar et al. |
| 8,733,038 B2 | 5/2014 | Kalkanoglu et al. |
| 8,776,455 B2 | 7/2014 | Azoulay |
| 8,789,321 B2 | 7/2014 | Ishida |
| 8,793,940 B2 | 8/2014 | Kalkanoglu et al. |
| 8,793,941 B2 | 8/2014 | Bosler et al. |
| 8,826,607 B2 | 9/2014 | Shiao et al. |
| 8,835,751 B2 | 9/2014 | Kalkanoglu et al. |
| 8,863,451 B2 | 10/2014 | Jenkins et al. |
| 8,898,970 B2 | 12/2014 | Jenkins et al. |
| 8,925,262 B2 | 1/2015 | Railkar et al. |
| 8,943,766 B2 | 2/2015 | Gombarick et al. |
| 8,946,544 B2 | 2/2015 | Jabos et al. |
| 8,950,128 B2 | 2/2015 | Kalkanoglu et al. |
| 8,959,848 B2 | 2/2015 | Jenkins et al. |
| 8,966,838 B2 | 3/2015 | Jenkins |
| 8,966,850 B2 | 3/2015 | Jenkins et al. |
| 8,994,224 B2 | 3/2015 | Mehta et al. |
| 9,032,672 B2 | 5/2015 | Livsey et al. |
| 9,153,950 B2 | 10/2015 | Yamanaka et al. |
| 9,166,087 B2 | 10/2015 | Chihlas et al. |
| 9,169,646 B2 | 10/2015 | Rodrigues et al. |
| 9,170,034 B2 | 10/2015 | Bosler et al. |
| 9,178,465 B2 | 11/2015 | Shiao et al. |
| 9,202,955 B2 | 12/2015 | Livsey et al. |
| 9,212,832 B2 | 12/2015 | Jenkins |
| 9,217,584 B2 | 12/2015 | Kalkanoglu et al. |
| 9,270,221 B2 | 2/2016 | Zhao |
| 9,273,885 B2 | 3/2016 | Rordigues et al. |
| 9,276,141 B2 | 3/2016 | Kalkanoglu et al. |
| 9,331,224 B2 | 5/2016 | Koch et al. |
| 9,356,174 B2 | 5/2016 | Duarte et al. |
| 9,359,014 B1 | 6/2016 | Yang et al. |
| 9,412,890 B1 | 8/2016 | Meyers |
| 9,528,270 B2 | 12/2016 | Jenkins et al. |
| 9,605,432 B1 | 3/2017 | Robbins |
| 9,711,672 B2 | 7/2017 | Wang |
| 9,755,573 B2 | 9/2017 | Livsey et al. |
| 9,786,802 B2 | 10/2017 | Shiao et al. |
| 9,831,818 B2 | 11/2017 | West |
| 9,912,284 B2 | 3/2018 | Svec |
| 9,923,515 B2 | 3/2018 | Rodrigues et al. |
| 9,938,729 B2 | 4/2018 | Coon |
| 9,991,412 B2 | 6/2018 | Gonzalez et al. |
| 9,998,067 B2 | 6/2018 | Kalkanoglu et al. |
| 10,027,273 B2 | 7/2018 | West et al. |
| 10,115,850 B2 | 10/2018 | Rodrigues et al. |
| 10,128,660 B1 | 11/2018 | Apte et al. |
| 10,156,075 B1 | 12/2018 | McDonough |
| 10,187,005 B2 | 1/2019 | Rodrigues et al. |
| 10,256,765 B2 | 4/2019 | Rodrigues et al. |
| 10,284,136 B1 | 5/2019 | Mayfield et al. |
| 10,454,408 B2 | 10/2019 | Livsey et al. |
| 10,530,292 B1 | 1/2020 | Cropper et al. |
| 10,560,048 B2 | 2/2020 | Fisher et al. |
| 10,563,406 B2 | 2/2020 | Kalkanoglu et al. |
| D879,031 S | 3/2020 | Lance et al. |
| 10,579,028 B1 | 3/2020 | Jacob |
| 10,784,813 B2 | 9/2020 | Kalkanoglu et al. |
| D904,289 S | 12/2020 | Lance et al. |
| 11,012,026 B2 | 5/2021 | Kalkanoglu et al. |
| 11,177,639 B1 | 11/2021 | Nguyen et al. |
| 11,217,715 B2 | 1/2022 | Sharenko |
| 11,251,744 B1 | 2/2022 | Bunea |
| 11,258,399 B2 | 2/2022 | Kalkanoglu et al. |
| 11,283,394 B2 | 3/2022 | Perkins et al. |
| 11,309,828 B2 | 4/2022 | Sirski et al. |
| 11,394,344 B2 | 7/2022 | Perkins et al. |
| 11,424,379 B2 | 8/2022 | Sharenko et al. |
| 11,431,280 B2 | 8/2022 | Liu et al. |
| 11,431,281 B2 | 8/2022 | Perkins et al. |
| 11,444,569 B2 | 9/2022 | Clemente et al. |
| 11,454,027 B2 | 9/2022 | Kuiper et al. |
| 11,459,757 B2 | 10/2022 | Nguyen et al. |
| 11,486,144 B2 | 11/2022 | Bunea et al. |
| 11,489,482 B2 | 11/2022 | Peterson et al. |
| 11,496,088 B2 | 11/2022 | Sirski et al. |
| 11,508,861 B1 | 11/2022 | Perkins et al. |
| 11,512,480 B1 | 11/2022 | Achor et al. |
| 11,527,665 B2 | 12/2022 | Boitnott |
| 11,545,927 B2 | 1/2023 | Abra et al. |
| 11,545,928 B2 | 1/2023 | Perkins et al. |
| 11,658,470 B2 | 5/2023 | Nguyen et al. |
| 11,661,745 B2 | 5/2023 | Bunea et al. |
| 11,689,149 B2 | 6/2023 | Clemente et al. |
| 11,705,531 B2 | 7/2023 | Sharenko et al. |
| 11,728,759 B2 | 8/2023 | Nguyen et al. |
| 11,732,490 B2 | 8/2023 | Achor et al. |
| 11,811,361 B1 | 11/2023 | Farhangi et al. |
| 11,824,486 B2 | 11/2023 | Nguyen et al. |
| 11,824,487 B2 | 11/2023 | Nguyen et al. |
| 11,843,067 B2 | 12/2023 | Nguyen et al. |
| 2002/0053360 A1 | 5/2002 | Kinoshita et al. |
| 2002/0129849 A1 | 9/2002 | Heckeroth |
| 2003/0101662 A1 | 6/2003 | Ullman |

(56) References Cited

U.S. PATENT DOCUMENTS

| | | |
|---|---|---|
| 2003/0132265 A1 | 7/2003 | Villela et al. |
| 2003/0217768 A1 | 11/2003 | Guha |
| 2004/0000334 A1 | 1/2004 | Ressler |
| 2004/0244827 A1 | 12/2004 | Hatsukaiwa et al. |
| 2005/0030187 A1 | 2/2005 | Peress et al. |
| 2005/0115603 A1 | 6/2005 | Yoshida et al. |
| 2005/0144870 A1 | 7/2005 | Dinwoodie |
| 2005/0178428 A1 | 8/2005 | Laaly et al. |
| 2005/0193673 A1 | 9/2005 | Rodrigues et al. |
| 2006/0042683 A1 | 3/2006 | Gangemi |
| 2006/0046084 A1 | 3/2006 | Yang et al. |
| 2007/0074757 A1* | 4/2007 | Mellott ............ C03C 17/007 136/256 |
| 2007/0181174 A1 | 8/2007 | Ressler |
| 2007/0193618 A1 | 8/2007 | Bressler et al. |
| 2007/0249194 A1 | 10/2007 | Liao |
| 2007/0295385 A1 | 12/2007 | Sheats et al. |
| 2008/0006323 A1 | 1/2008 | Kalkanoglu et al. |
| 2008/0035140 A1 | 2/2008 | Placer et al. |
| 2008/0315061 A1 | 2/2008 | Placerl. et al. |
| 2008/0078440 A1 | 4/2008 | Lim et al. |
| 2008/0185748 A1 | 8/2008 | Kalkanoglu |
| 2008/0271774 A1 | 11/2008 | Kalkanoglu et al. |
| 2008/0302030 A1 | 12/2008 | Stancel et al. |
| 2009/0000222 A1 | 1/2009 | Kalkanoglu et al. |
| 2009/0014057 A1 | 1/2009 | Croft et al. |
| 2009/0014058 A1 | 1/2009 | Croft et al. |
| 2009/0019795 A1 | 1/2009 | Szacsvay et al. |
| 2009/0044850 A1 | 2/2009 | Kimberley |
| 2009/0114261 A1 | 5/2009 | Stancel et al. |
| 2009/0133340 A1 | 5/2009 | Shiao et al. |
| 2009/0159118 A1 | 6/2009 | Kalkanoglu et al. |
| 2009/0178350 A1* | 7/2009 | Kalkanoglu ........ E04F 13/0864 52/173.3 |
| 2009/0229652 A1 | 9/2009 | Mapel et al. |
| 2009/0275247 A1* | 11/2009 | Richter ............. H01R 4/185 439/502 |
| 2010/0019580 A1 | 1/2010 | Croft et al. |
| 2010/0095618 A1 | 4/2010 | Edison et al. |
| 2010/0101634 A1 | 4/2010 | Frank et al. |
| 2010/0116325 A1 | 5/2010 | Nikoonahad |
| 2010/0131108 A1 | 5/2010 | Meyer |
| 2010/0139184 A1 | 6/2010 | Williams et al. |
| 2010/0146878 A1 | 6/2010 | Koch et al. |
| 2010/0159221 A1 | 6/2010 | Kourtakis et al. |
| 2010/0170169 A1 | 7/2010 | Railkar et al. |
| 2010/0186798 A1 | 7/2010 | Tormen et al. |
| 2010/0242381 A1 | 9/2010 | Jenkins |
| 2010/0313499 A1 | 12/2010 | Gangemi |
| 2010/0325976 A1 | 12/2010 | DeGenfelder et al. |
| 2010/0326488 A1 | 12/2010 | Aue et al. |
| 2010/0326501 A1 | 12/2010 | Zhao et al. |
| 2011/0030761 A1 | 2/2011 | Kalkanoglu et al. |
| 2011/0036386 A1 | 2/2011 | Browder |
| 2011/0036389 A1 | 2/2011 | Hardikar et al. |
| 2011/0048507 A1 | 3/2011 | Livsey et al. |
| 2011/0058337 A1 | 3/2011 | Han et al. |
| 2011/0061326 A1 | 3/2011 | Jenkins |
| 2011/0100436 A1 | 5/2011 | Cleereman et al. |
| 2011/0104488 A1 | 5/2011 | Muessig et al. |
| 2011/0132427 A1 | 6/2011 | Kalkanoglu et al. |
| 2011/0168238 A1 | 7/2011 | Metin et al. |
| 2011/0239555 A1 | 10/2011 | Cook et al. |
| 2011/0302859 A1 | 12/2011 | Crasnianski |
| 2011/0314753 A1 | 12/2011 | Farmer et al. |
| 2012/0034799 A1 | 2/2012 | Hunt |
| 2012/0060434 A1 | 3/2012 | Jacobs |
| 2012/0060902 A1 | 3/2012 | Drake |
| 2012/0085392 A1 | 4/2012 | Albert et al. |
| 2012/0137600 A1 | 6/2012 | Jenkins |
| 2012/0176077 A1 | 7/2012 | Oh et al. |
| 2012/0212065 A1 | 8/2012 | Cheng et al. |
| 2012/0233940 A1 | 9/2012 | Perkins et al. |
| 2012/0240490 A1 | 9/2012 | Gangemi |
| 2012/0260977 A1 | 10/2012 | Stancel |
| 2012/0266942 A1 | 10/2012 | Komatsu et al. |
| 2012/0279150 A1 | 11/2012 | Pislkak et al. |
| 2012/0282437 A1 | 11/2012 | Clark et al. |
| 2012/0291848 A1 | 11/2012 | Sherman et al. |
| 2013/0008499 A1 | 1/2013 | Verger et al. |
| 2013/0014455 A1 | 1/2013 | Grieco |
| 2013/0118558 A1 | 5/2013 | Sherman |
| 2013/0193769 A1 | 8/2013 | Mehta et al. |
| 2013/0247988 A1 | 9/2013 | Reese et al. |
| 2013/0284267 A1 | 10/2013 | Plug et al. |
| 2013/0306137 A1 | 11/2013 | Ko |
| 2014/0090697 A1 | 4/2014 | Rodrigues et al. |
| 2014/0150843 A1 | 6/2014 | Pearce et al. |
| 2014/0173997 A1 | 6/2014 | Jenkins |
| 2014/0179220 A1 | 6/2014 | Railkar et al. |
| 2014/0182222 A1 | 7/2014 | Kalkanoglu et al. |
| 2014/0208675 A1 | 7/2014 | Beerer et al. |
| 2014/0254776 A1 | 9/2014 | O'Connor et al. |
| 2014/0266289 A1 | 9/2014 | Della Sera et al. |
| 2014/0311556 A1 | 10/2014 | Feng et al. |
| 2014/0352760 A1 | 12/2014 | Haynes et al. |
| 2014/0366464 A1 | 12/2014 | Rodrigues et al. |
| 2015/0089895 A1 | 4/2015 | Leitch |
| 2015/0162459 A1 | 6/2015 | Lu et al. |
| 2015/0340516 A1 | 11/2015 | Kim et al. |
| 2015/0349173 A1 | 12/2015 | Morad et al. |
| 2016/0105144 A1 | 4/2016 | Haynes et al. |
| 2016/0142008 A1 | 5/2016 | Lopez et al. |
| 2016/0254776 A1 | 9/2016 | Rodrigues et al. |
| 2016/0276508 A1 | 9/2016 | Huang et al. |
| 2016/0359451 A1 | 12/2016 | Mao et al. |
| 2017/0159292 A1 | 6/2017 | Chihlas et al. |
| 2017/0179319 A1 | 6/2017 | Yamashita et al. |
| 2017/0179726 A1 | 6/2017 | Garrity et al. |
| 2017/0237390 A1 | 8/2017 | Hudson et al. |
| 2017/0331415 A1 | 11/2017 | Koppi et al. |
| 2018/0094438 A1 | 4/2018 | Wu et al. |
| 2018/0097472 A1 | 4/2018 | Anderson et al. |
| 2018/0115275 A1 | 4/2018 | Flanigan et al. |
| 2018/0254738 A1 | 9/2018 | Yang et al. |
| 2018/0294765 A1 | 10/2018 | Friedrich et al. |
| 2018/0351502 A1 | 12/2018 | Almy et al. |
| 2018/0367089 A1 | 12/2018 | Stutterheim et al. |
| 2019/0030867 A1 | 1/2019 | Sun et al. |
| 2019/0081436 A1 | 3/2019 | Onodi et al. |
| 2019/0123679 A1 | 4/2019 | Rodrigues et al. |
| 2019/0253022 A1 | 8/2019 | Hardar et al. |
| 2019/0305717 A1 | 10/2019 | Allen et al. |
| 2020/0109320 A1 | 4/2020 | Jiang |
| 2020/0144958 A1 | 5/2020 | Rodrigues et al. |
| 2020/0220819 A1 | 7/2020 | Vu et al. |
| 2020/0224419 A1 | 7/2020 | Boss et al. |
| 2020/0343397 A1 | 10/2020 | Hem-Jensen |
| 2021/0083619 A1 | 3/2021 | Hegedus |
| 2021/0115223 A1 | 4/2021 | Bonekamp et al. |
| 2021/0159353 A1 | 5/2021 | Li et al. |
| 2021/0211093 A1* | 7/2021 | Cassagne ............. H02S 40/34 |
| 2021/0301536 A1 | 9/2021 | Baggs et al. |
| 2021/0343886 A1 | 11/2021 | Sharenko et al. |
| 2022/0029037 A1 | 1/2022 | Nguyen et al. |
| 2022/0149213 A1 | 5/2022 | Mensink et al. |

FOREIGN PATENT DOCUMENTS

| | | |
|---|---|---|
| CN | 202797032 U | 3/2013 |
| CN | 217150978 U | 8/2022 |
| DE | 1958248 A1 | 11/1971 |
| EP | 1039361 A1 | 9/2000 |
| EP | 1837162 A1 | 9/2007 |
| EP | 1774372 A1 | 7/2011 |
| EP | 2446481 A2 | 5/2012 |
| EP | 2784241 A1 | 10/2014 |
| EP | 3772175 A1 | 2/2021 |
| JP | 10046767 A | 2/1998 |
| JP | 2002-106151 A | 4/2002 |
| JP | 2001-098703 A | 10/2002 |
| JP | 2017-027735 A | 2/2017 |
| JP | 2018053707 A | 4/2018 |
| KR | 20090084060 A | 8/2009 |

(56) References Cited

FOREIGN PATENT DOCUMENTS

| | | |
|---|---|---|
| KR | 10-1348283 B1 | 1/2014 |
| KR | 10-2019-0000367 A | 1/2019 |
| KR | 10-2253483 B1 | 5/2021 |
| NL | 2026856 B1 | 6/2022 |
| WO | 2010/151777 A2 | 12/2010 |
| WO | 2011/049944 A1 | 4/2011 |
| WO | 2015/133632 A1 | 9/2015 |
| WO | 2018/000589 A1 | 4/2018 |
| WO | 2019/201416 A1 | 10/2019 |
| WO | 2020-159358 A1 | 8/2020 |
| WO | 2021-247098 A1 | 12/2021 |
| WO | 2022/051593 A1 | 3/2022 |

OTHER PUBLICATIONS

RGS Energy, 3.5KW Powerhouse 3.0 system installed in an afternoon; Jun. 7, 2019 <<facebook.com/RGSEnergy/>> retrieved Feb. 2, 2021.

Tesla, Solar Roof <<tesla.com/solarroof>> retrieved Feb. 2, 2021.

"Types of Roofing Underlayment", Owens Corning Roofing; <<https://www.owenscorning.com/en-us/roofing/tools/how-roofing-underlayment-helps-protect-your-home>> retrieved Nov. 1, 2021.

\* cited by examiner

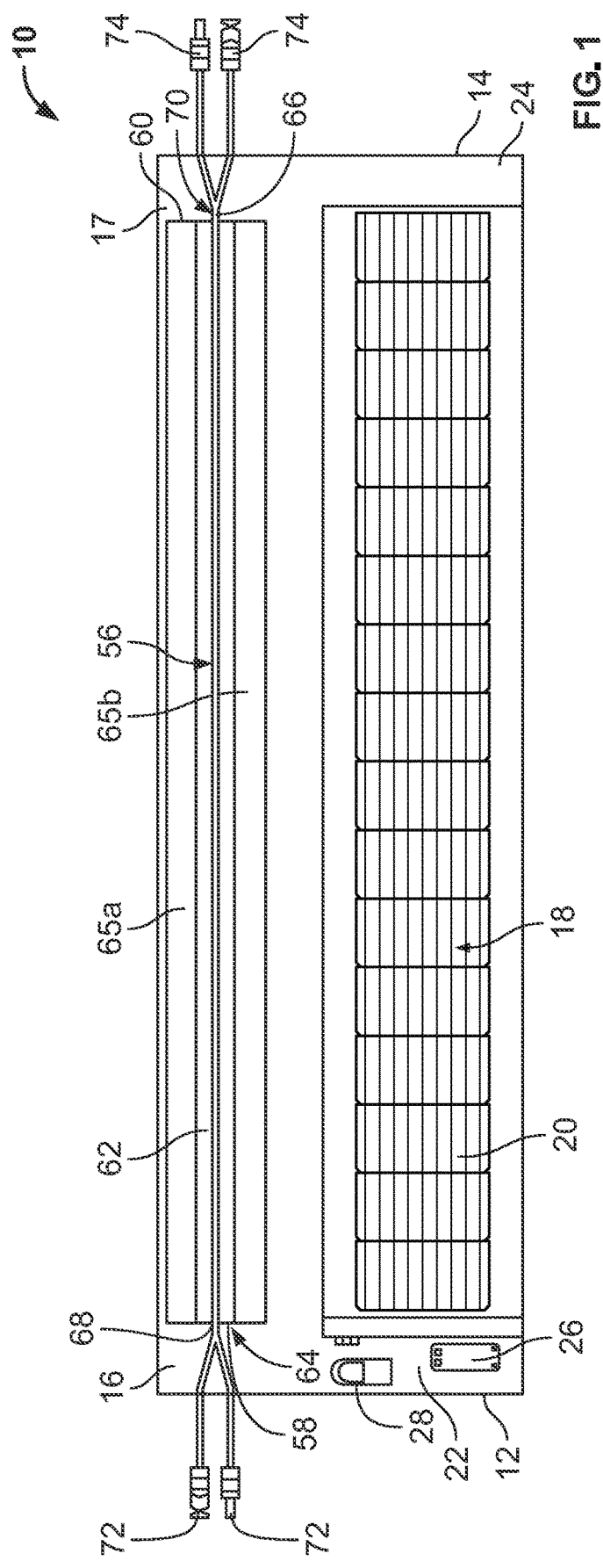
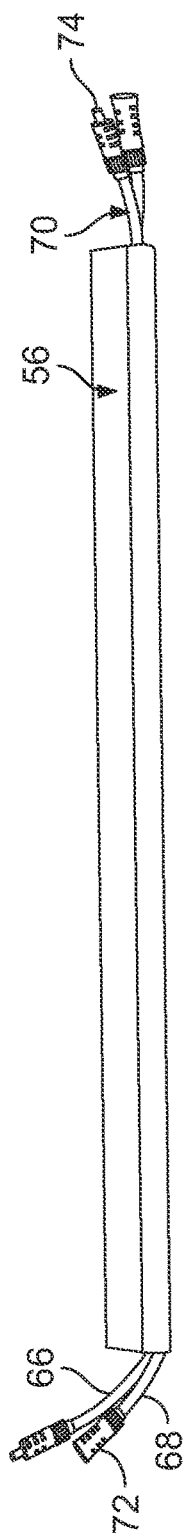
FIG. 1
FIG. 2

JUMPER MODULE WITH SLEEVE

CROSS-REFERENCE TO RELATED APPLICATIONS

This application is a Section 111(a) application relating to and claiming the benefit of commonly owned, U.S. Provisional Patent Application Ser. No. 63/411,269, filed Sep. 29, 2022, entitled "JUMPER MODULE WITH SLEEVE," the contents of which are incorporated herein by reference in its entirety.

FIELD OF THE INVENTION

The present invention relates to jumper modules for photovoltaic systems and, more particularly, jumper modules for electrically connecting subarrays of photovoltaic modules.

BACKGROUND

Photovoltaic modules can be placed on building roofs (e.g., residential roofs) to generate electricity.

SUMMARY

In some embodiments, a system includes a plurality of photovoltaic modules installed on a roof deck, wherein the plurality of photovoltaic modules are arranged in an array on the roof deck; at least one jumper module electrically connecting a first subarray of the array and a second subarray of the array, wherein the at least one jumper module includes, a first end and a second end opposite the first end, and a sleeve, wherein the sleeve extends from the first end to the second end; and at least one electrical cable, wherein the sleeve is sized and shaped to receive the at least one electrical cable, and wherein the at least one electrical cable electrically connects the first subarray to the second subarray.

In some embodiments, the at least one jumper module includes a headlap portion, wherein the headlap portion extends from the first end to the second end, and wherein the sleeve is attached to the headlap portion. In some embodiments, the sleeve includes a tubular portion having an aperture, and wherein the aperture is sized and shaped to receive the at least one electrical cable. In some embodiments, the at least one jumper module includes a first side lap located at the first end, and wherein the at least one jumper module includes a second side lap located at the second end. In some embodiments, the at least one jumper module includes a first junction box located on the first side lap, wherein the first junction box is electrically connected to the at least one electrical cable. In some embodiments, at least one of the plurality of photovoltaic modules of the first subarray includes a second junction box, wherein the second junction box is electrically connected to the first junction box. In some embodiments, at least one of the plurality of photovoltaic modules of the second subarray includes a third junction box, wherein the third junction box is electrically connected to the first junction box by the at least one electrical cable.

In some embodiments, the at least one of the plurality of photovoltaic modules of the first subarray includes a headlap portion, and wherein one of the at least one jumper module overlays the headlap portion of the at least one of the plurality of photovoltaic modules. In some embodiments, the at least one of the plurality of photovoltaic modules of the first subarray includes a first side lap, and wherein the first side lap of the one of the at least one jumper module is proximate to the first side lap of the at least one of the plurality of photovoltaic modules of the first subarray. In some embodiments, the at least one of the plurality of photovoltaic modules of the first subarray includes a second side lap, and wherein the second side lap of the one of the at least one jumper module is proximate to the second side lap of the at least one of the plurality of photovoltaic modules of the first subarray. In some embodiments, the at least one jumper module includes a plurality of jumper modules, and wherein the first side lap of another one of the plurality of jumper modules overlaps the second side lap of the one of the plurality of jumper modules.

In some embodiments, the first junction box of the another one of the plurality of jumper modules is electrically connected to the at least one electrical cable of the one of the plurality of jumper modules. In some embodiments, the at least one electrical cable includes a first end, a second end opposite the first end of the at least one electrical cable, a first electrical connector at the first end of the at least one electrical cable, and a second electrical connector at the second end of the at least one electrical cable, wherein the first electrical connector extends from the sleeve at the first end of the at least one jumper module, and wherein the second electrical connector extends from the second end of the sleeve at the second end of the at least one jumper module.

In some embodiments, the first electrical connector is electrically connected to the first junction box and the second electrical connector is electrically connected to the third junction box. In some embodiments, at least one of the plurality of photovoltaic modules of the second subarray includes a headlap portion, and wherein the another one of the plurality of jumper modules overlaps the headlap portion of the at least one of the plurality of photovoltaic modules of the second subarray.

In some embodiments, the at least one jumper module includes at least one solar cell, an encapsulant encapsulating the at least one solar cell, wherein the encapsulant includes a first surface and a second surface opposite the first surface, and a frontsheet juxtaposed with the first surface of the encapsulant, wherein the frontsheet includes a glass layer, and a polymer layer attached to the glass layer, and wherein the polymer layer forms an upper surface of the at least one jumper module. In some embodiments, the at least one jumper module includes a backsheet juxtaposed with the second surface of the encapsulant, wherein the backsheet includes a first surface and a second surface opposite the first surface of the backsheet, and wherein the second surface of the backsheet forms a lower surface of the at least one jumper module.

In some embodiments, the backsheet is composed of thermoplastic polyolefin (TPO), and wherein the sleeve is composed of thermoplastic polyolefin (TPO). In some embodiments, the backsheet forms the headlap portion, and wherein the sleeve is attached to the first surface of the headlap portion. In some embodiments, the backsheet forms the headlap portion, and wherein the sleeve is attached to the second surface of the headlap portion.

BRIEF DESCRIPTION OF THE DRAWINGS

FIG. 1 is a top plan view of some embodiments of a jumper module for a photovoltaic system;

FIG. 2 illustrates some embodiments of a jumper module sleeve for a jumper module of a photovoltaic system;

DETAILED DESCRIPTION

Figure 3:
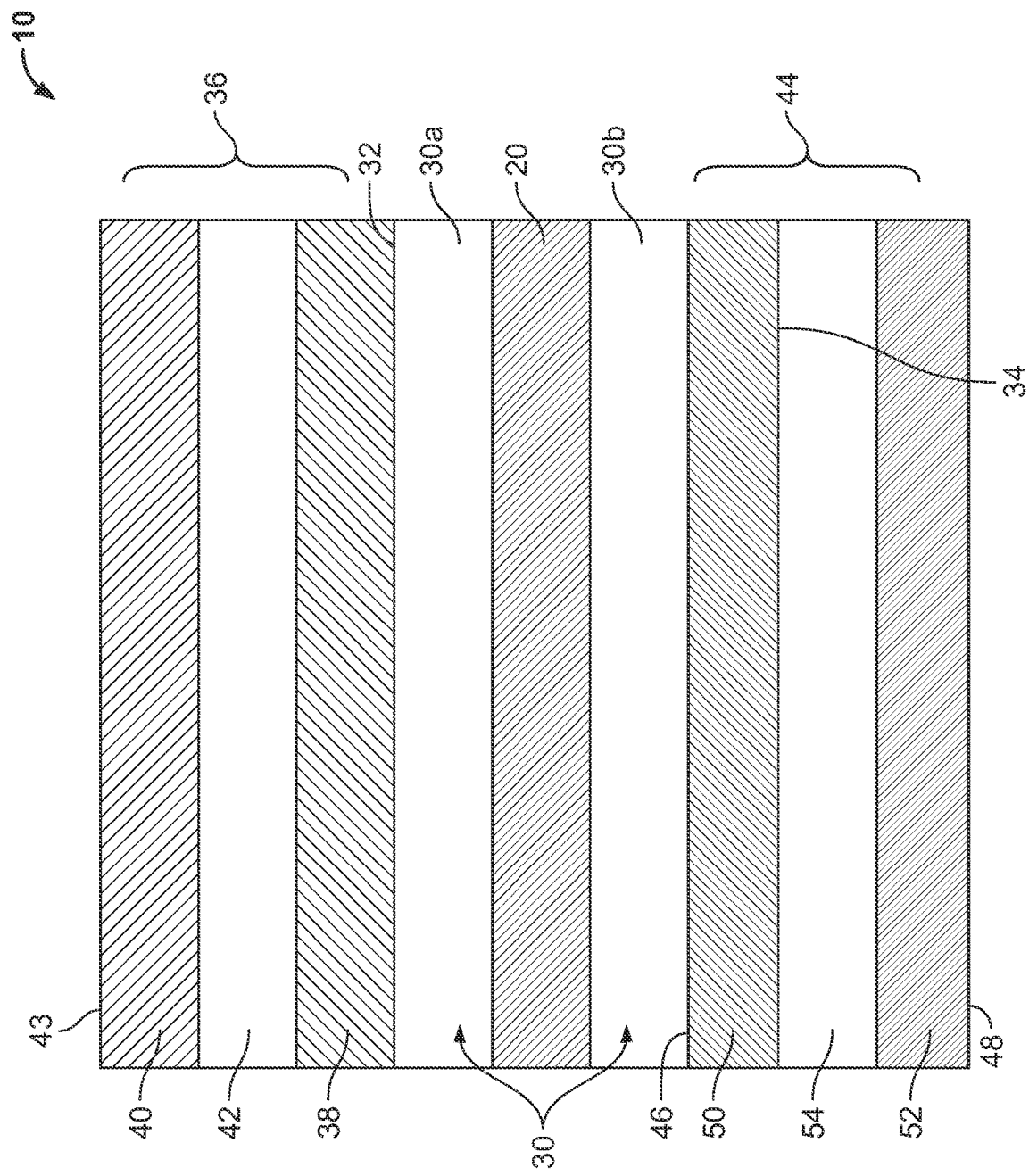
FIG. 3 is schematic view of an active portion of the jumper module shown in FIG. 1.

Referring to FIGS. 1 and 2, in some embodiments, a jumper module 10 includes a first end 12, a second end 14 opposite the first end 12, a headlap portion 16 extending from the first end 12 to the second end 14, a reveal portion 18 having at least one solar cell 20, and a first side lap 22 located at the first end 12. In some embodiments, the jumper module 10 is configured to be installed on a roof deck. In some embodiments, the headlap portion 16 includes a first surface 17. In some embodiments, the first surface 17 is opposite the roof deck. In some embodiments, the jumper module 10 includes a second side lap 24 located at the second end 14. In some embodiments, the jumper module 10 is configured to be installed on a roof deck. In some embodiments, the headlap portion 16 includes a first surface 17. In some embodiments, the first surface 17 is opposite the roof deck. In some embodiments, a first junction box 26 is located on the first side lap 22. In some embodiments, a second junction box 28 is located on the first side lap 22. In some embodiments, the jumper module 10 includes a structure, composition and/or function similar to those of one or more embodiments of the jumper modules disclosed in PCT International Patent Publication No. WO 2022/051593, Application No. PCT/US2021/049017, published Mar. 10, 2022, entitled Building Integrated Photovoltaic System, owned by GAF Energy LLC, and U.S. Pat. No. 11,251,744 to Bunea et al., issued Feb. 15, 2022, entitled "Photovoltaic Shingles and Methods of Installing Same," the contents of each of which are incorporated by reference herein in their entirety.

In some embodiments, the at least one solar cell 20 includes a plurality of the solar cells 20. In some embodiments, the plurality of solar cells 20 includes two solar cells. In some embodiments, the plurality of solar cells 20 includes three solar cells. In some embodiments, the plurality of solar cells 20 includes four solar cells. In some embodiments, the plurality of solar cells 20 includes five solar cells. In some embodiments, the plurality of solar cells 20 includes six solar cells. In some embodiments, the plurality of solar cells 20 includes seven solar cells. In some embodiments, the plurality of solar cells 20 includes eight solar cells. In some embodiments, the plurality of solar cells 20 includes nine solar cells. In some embodiments, the plurality of solar cells 20 includes ten solar cells. In some embodiments, the plurality of solar cells 20 includes eleven solar cells. In some embodiments, the plurality of solar cells 20 includes twelve solar cells. In some embodiments, the plurality of solar cells 20 includes thirteen solar cells. In some embodiments, the plurality of solar cells 20 includes fourteen solar cells. In some embodiments, the plurality of solar cells 20 includes fifteen solar cells. In some embodiments, the plurality of solar cells 20 includes sixteen solar cells. In some embodiments, the plurality of solar cells 20 includes more than sixteen solar cells.

In some embodiments, the plurality of solar cells 20 is arranged in one row (i.e., one reveal). In another embodiment, the plurality of solar cells 20 is arranged in two rows (i.e., two reveals). In another embodiment, the plurality of solar cells 20 is arranged in three rows (i.e., three reveals). In another embodiment, the plurality of solar cells 20 is arranged in four rows (i.e., four reveals). In another embodiment, the plurality of solar cells 20 is arranged in five rows (i.e., five reveals). In another embodiment, the plurality of solar cells 20 is arranged in six rows (i.e., six reveals). In other embodiments, the plurality of solar cells 20 is arranged in more than six rows. In some embodiments, the at least one solar cell 20 is electrically inactive (i.e., a "dummy" solar cell). In some embodiments, the jumper module 10 does not include the at least one solar cell 20.

Referring to FIG. 3, in some embodiments, the jumper module 10 includes an encapsulant 30 encapsulating the at least one solar cell 20. In some embodiments, the encapsulant 30 includes a first layer 30a having a first surface 32 and a second layer 30b having a second surface 34 opposite the first surface 32. In some embodiments, the jumper module 10 includes a frontsheet 36 juxtaposed with the first surface 32 of the first layer 30a of the encapsulant 30. In some embodiments, the frontsheet 36 includes a glass layer 38. In some embodiments, the frontsheet 36 includes a polymer layer 40 attached to the glass layer 38. In some embodiments, the polymer layer 40 forms an upper surface of the at least one jumper module 10. In some embodiments, the polymer layer 40 is attached to the glass layer 38 by a first adhesive layer 42. In some embodiments, an upper surface 43 of the polymer layer 40 is an upper surface of the jumper module 10. In some embodiments, the upper surface 43 of the polymer layer 40 is textured. In some embodiments, the upper surface 43 of the polymer layer 40 is embossed. In some embodiments, the upper surface 43 of the polymer layer 40 is embossed with a plurality of indentations. In some embodiments, the upper surface 43 of the polymer layer 40 includes a pattern. In some embodiments, the upper surface 43 of the polymer layer 40 includes a printed pattern. In some embodiments, the upper surface 43 of the polymer layer 40 includes an embossed pattern. In some embodiments, the upper surface 43 of the polymer layer 40 includes a textured pattern.

In some embodiments, the jumper module 10 includes a backsheet 44. In some embodiments, the backsheet 44 is juxtaposed with the second surface 34 of the second layer 30b of the encapsulant 30. In some embodiments, the backsheet 44 includes a first surface 46 and a second surface 48 opposite the first surface 46 of the backsheet 44. In some embodiments, the second surface 48 of the backsheet 44 forms a lower surface of the jumper module 10. In some embodiments, the backsheet 44 includes a first layer 50. In some embodiments, the backsheet 44 includes a second layer 52. In some embodiments, the second layer 52 is attached to the first layer 50 by a second adhesive layer 54. In some embodiments, the backsheet 44 includes only one layer. In some embodiments, the backsheet 44 includes only the first layer 50. In some embodiments, the backsheet 44 is composed of a polymer. In some embodiments, the backsheet 44 is composed of thermoplastic polyolefin (TPO). In some embodiments, the backsheet 44 forms the headlap portion 16.

In some embodiments, each of the encapsulant 30, the frontsheet 36, including each of the glass layer 38, the polymer layer 40, and the first adhesive layer 42, and the backsheet 44, including the first layer 50, the second layer 52, and the second adhesive layer 54 of the jumper module 10 includes a structure, composition and/or function of similar to those of more or one of the embodiments of the corresponding components disclosed in PCT International Patent Publication No. WO 2022/051593, Application No. PCT/US2021/049017, published Mar. 10, 2022, entitled Building Integrated Photovoltaic System, owned by GAF Energy LLC, and U.S. Pat. No. 11,251,744 to Bunea et al., issued Feb. 15, 2022, entitled "Photovoltaic Shingles and Methods of Installing Same," the contents of each of which are incorporated by reference herein in their entirety.

Referring to FIGS. 1 and 2, in some embodiments, the jumper module 10 includes a sleeve 56. In some embodiments, the sleeve 56 is attached to the headlap portion 16. In some embodiments, the sleeve 56 includes a first end 58 and a second end 60 opposite the first end 58. In some embodiments, the sleeve 56 extends from the first end 12 to the second end 14 of the jumper module 10. In some embodiments, the first end 58 of the sleeve 56 is proximate to the first end 12 of the jumper module 10. In some embodiments, the second end 60 of the sleeve 56 is proximate to the second end 60 of the jumper module 10. In some embodiments, the first end 58 and the second end 60 of the sleeve 56 are between the first end 12 and the second end 14 of the jumper module 10.

In some embodiments, the sleeve 56 includes a tubular portion 62. In some embodiments, the tubular portion 62 includes an aperture 64. In some embodiments, the aperture 64 extends from the first end 58 to the second end 60 of the sleeve 56. In some embodiments, the tubular portion 62 has a circular-shaped cross-section. In some embodiments, the tubular portion 62 has a square-shaped cross-section. In some embodiments, the tubular portion 62 has a triangular-shaped cross-section. In some embodiments, the tubular portion 62 has a rectangular-shaped cross-section. In some embodiments, the tubular portion 62 has a star-shaped cross-section. In some embodiments, the tubular portion 62 has a cross-shaped cross-section. In some embodiments, the tubular portion 62 has a polygonal-shaped cross-section.

In some embodiments, the aperture 64 has a circular-shaped cross-section. In some embodiments, the aperture 64 has a square-shaped cross-section. In some embodiments, the aperture 64 has a triangular-shaped cross-section. In some embodiments, the aperture 64 has a rectangular-shaped cross-section. In some embodiments, the aperture 64 has a star-shaped cross-section. In some embodiments, the aperture 64 has a cross-shaped cross-section. In some embodiments, the aperture 64 has a polygonal-shaped cross-section.

In some embodiments, the sleeve 56 includes a first flange 65a. In some embodiments, the first flange 65a extends from the tubular portion 62. In some embodiments, the sleeve 56 includes a second flange 65b. In some embodiments, the second flange 65b extends from the tubular portion 62. In some embodiments, the second flange 65b extends from the tubular portion 62 opposite the first flange 65a. In some embodiments, the first flange 65a is planar. In some embodiments, the second flange 65b is planar.

In some embodiments, the sleeve 56 is composed of a polymer. In some embodiments, the sleeve 56 is composed of thermoplastic polyolefin (TPO). In some embodiments, the sleeve 56 is composed of a single ply TPO roofing membrane. In other embodiments, non-limiting examples of TPO membranes are disclosed in U.S. Pat. No. 9,359,014 to Yang et al., which is incorporated by reference herein in its entirety. In another embodiment, the sleeve 56 is composed of polyvinyl chloride (PVC). In some embodiments, the sleeve 56 is composed of polyethylene terephthalate ("PET"). In another embodiment, the sleeve 56 is composed of styrene acrylic copolymer. In some embodiments, the sleeve 56 is composed of ethylene tetrafluoroethylene ("ETFE"). In some embodiments, the sleeve 56 is composed of an acrylic such as polymethyl methacrylate ("PMMA"). In some embodiments, the sleeve 56 is composed of polyvinyl chloride. In some embodiments, the sleeve 56 is composed of ethylene propylene diene ruionomer (EPDM) rubber. In some embodiments, the sleeve 56 includes a flame retardant additive. In some embodiments, the flame retardant additive may be clays, nanoclays, silicas, carbon black, metal hydroxides such as aluminum hydroxide, metal foils, graphite, and combinations thereof. In some embodiments, the sleeve 56 is white in color. In some embodiments, the sleeve 56 is white TPO.

In some embodiments, the sleeve 56 is attached to the first surface 17 of the headlap portion 16. In some embodiments, the first flange 65a and the second flange 65b of the sleeve 56 is attached to the first surface 17 of the headlap portion 16.

In some embodiments, the sleeve 56 and the headlap portion 16 are welded to one another. In some embodiments, the sleeve 56 and the headlap portion 16 are ultrasonically welded to one another. In some embodiments, the sleeve 56 and the headlap portion 16 are heat welded to one another. In some embodiments, the sleeve 56 and the headlap portion 16 are thermally bonded to one another. In some embodiments, the sleeve 56 and the headlap portion 16 are adhered to one another by an adhesive. In some embodiments, the sleeve 56 and the headlap portion 16 are mechanically attached to one another. In some embodiments, the sleeve 56 and the headlap portion 16 are fastened to one another. In some embodiments, the sleeve 56 and the headlap portion 16 are fastened to one another by a fastener. In some embodiments, the fastener may be one or more of a nail, a screw, a rivet, a staple or a bolt. In some embodiments, the sleeve 56 is configured to be attached to the headlap portion 16 prior to installation of the jumper module 10 on a roof deck. In some embodiments, the sleeve 56 is configured to be attached to the headlap portion 16 during installation of the jumper module 10 on a roof deck.

In some embodiments, the sleeve 56 is configured, sized, and shaped to receive at least one electrical cable 66. In some embodiments, the at least one electrical cable 66 is an electrical wire. In some embodiments, the at least one electrical cable 66 is a flat ribbon wire. In some embodiments, the at least one electrical cable 66 includes a plurality of the electrical cables 66. In some embodiments, the at least one electrical cable 66 includes a first end 68 and a second end 70 opposite the first end 68. In some embodiments, at least one electrical connector 72 is located at the first end 68. In some embodiments, the at least one electrical connector 72 includes a plurality of the electrical connectors 72. In some embodiments, at least one electrical connector 74 is located at the second end 70. In some embodiments, the at least one electrical connector 74 includes a plurality of the electrical connectors 74.

In some embodiments, the first end 68 of the at least one electrical cable 66 and the at least one electrical connector 72 extend outwardly from the first end 58 of the sleeve. In some embodiments, the at least one electrical connector 72 extends outwardly from the first end 58 of the sleeve 56. In some embodiments, the second end 70 of the at least one electrical cable 66 and the at least one electrical connector 74 extend outwardly from the second end 60 of the sleeve.

In some embodiments, the at least one electrical connector 74 extends outwardly from the second end 60 of the sleeve 56.

Referring to FIGS. 4A through 8, in some embodiments, the jumper module 10 is configured to be a component of a photovoltaic system 100 installed on a roof deck 102. In some embodiments, the roof deck 102 is a steep slope roof deck. As defined herein, a "steep slope roof deck" is any roof deck that is disposed on a roof having a pitch of Y/X, where Y and X are in a ratio of 4:12 to 12:12, where Y corresponds to the "rise" of the roof, and where X corresponds to the "run" of the roof.

In some embodiments, the roof deck 102 may be a sloped roof of a structure. As used herein, a "sloped" roof deck is a roof deck that has a slope less than a slope of a steep slope roof deck, but is not a flat roof deck.

In some embodiments, the roof deck 102 is a component of a commercial roof. In some embodiments, the roof deck 102 has a slope of 3 inches per foot or less. In some embodiments, the roof deck 102 has a slope of 0.25 inch to 3 inches per foot. In some embodiments, the roof deck 102 has a slope of 0.25 inch to 2 inches per foot. In some embodiments, the roof deck 102 has a slope of 0.25 inch to 1 inch per foot. In some embodiments, the roof deck 102 has a slope of 1 inch to 3 inches per foot. In some embodiments, the roof deck 102 has a slope of 1 inch to 2 inches per foot. In some embodiments, the roof deck 102 has a slope of 2 inches to 3 inches per foot.

In some embodiments, the photovoltaic system 100 includes an underlayment layer 104 installed on the roof deck 102. In some embodiments, the photovoltaic system 100 includes a plurality of photovoltaic modules 110. In some embodiments, the plurality of photovoltaic modules 110 overlay the underlayment layer 104. In some embodiments, the photovoltaic modules 110 are arranged in an array on the roof deck 102. In some embodiments, the array of the photovoltaic modules 110 includes subarrays S1, S2. In certain embodiments, the array includes more than the two subarrays S1, S2. In some embodiments, the array includes a single array. In some embodiments, each of the subarrays S1, S2 include a plurality of rows R of the photovoltaic modules 110.

In some embodiments, each of the photovoltaic modules 110 includes a reveal portion 112 having a plurality of solar cells 114, a headlap portion 116, and first and second side laps 118, 120. In some embodiments, the first side lap 118 of one of the photovoltaic modules 110 in the subarray S2 overlays the second side lap 120 of an adjacent another one of the photovoltaic modules 110 in the subarray S1 in the same one of the rows R. In some embodiments, the reveal portion 112 of one of the photovoltaic modules 110 in a subarray S1 overlays the headlap portion 116 of an adjacent another one of the photovoltaic modules 110 of the subarray S1. In some embodiments, the overlay of the first and second side laps 118, 120 form at least one wireway 122. In some embodiments, a first junction box 124 is located on the first side lap 118. In some embodiments, a second junction box 126 is located on the first side lap 118.

In some embodiments, the jumper module 10 is installed directly to the roof deck 102. In some embodiments, the jumper module 10 is installed on the roof deck 102 by a plurality of fasteners. In some embodiments, the plurality of fasteners are installed through the headlap portion 16. In some embodiments, the plurality of fasteners includes a plurality of nails. In some embodiments, the plurality of fasteners includes a plurality of screws. In some embodiments, the plurality of fasteners includes a plurality of rivets. In some embodiments, the plurality of fasteners includes a plurality of staples.

In some embodiments, the jumper module 10 is installed on the roof deck 102 by an adhesive. In some embodiments, the adhesive is adhered directly to the roof deck 102. In some embodiments, the adhesive is adhered to an underlayment. In some embodiments, the underlayment is adhered directly to the roof deck 102. In some embodiments, the adhesive is located on a rear surface of the jumper module 10. In some embodiments, the adhesive includes at least one adhesive strip. In some embodiments, the adhesive includes a plurality of adhesive strips. In some embodiments, the plurality of adhesive strips is arranged intermittently. In some embodiments, the adhesive is located proximate to one edge of the jumper module 10. In some embodiments, the adhesive is a peel and stick film sheet. In some embodiments, the peel and stick film sheet includes at least one sheet of film removably attached to the rear surface. In some embodiments, the peel and stick film sheet is composed of EverGuard Freedom HW peel and stick membrane manufactured by GAF. In some embodiments, the adhesive includes polyvinyl butyrate, acrylic, silicone, or polycarbonate. In some embodiments, the adhesive includes pressure sensitive adhesives.

In some embodiments, the photovoltaic module 110 includes a structure, composition, components, and/or function similar to those of one or more embodiments of the photovoltaic modules disclosed in PCT International Patent Publication No. WO 2022/051593, Application No. PCT/US2021/049017, published Mar. 10, 2022, entitled "Building Integrated Photovoltaic System," owned by GAF Energy LLC, and U.S. Pat. No. 11,251,744 to Bunea et al., issued Feb. 15, 2022, entitled "Photovoltaic Shingles and Methods of Installing Same," the contents of each of which are incorporated by reference herein in their entirety.

In some embodiments, the system includes a plurality of roofing shingles. In some embodiments, the jumper modules 10 and/or the photovoltaic modules 110 have an appearance that aesthetically match the appearance of the plurality of roofing shingles. In some embodiments, the roofing shingle is a cuttable roofing module. In some embodiments, the roofing shingle is a nailable roofing module. In some embodiments, the roofing shingle is a cuttable roofing module shown and described in U.S. application Ser. No. 17/831,307, filed Jun. 2, 2022, titled "Roofing Module System," and published under U.S. Patent Application Publication No. 2022-0393637 on Dec. 8, 2022; and/or U.S. application Ser. No. 18/169,718, filed Feb. 15, 2023, titled "Roofing Module System," and published under U.S. Patent Application Publication No. 2023-0203815 on Jun. 29, 2023, the disclosures of each of which are incorporated by reference herein in their entireties.

In some embodiments, the jumper module 10 overlays an uppermost one of the photovoltaic modules 110a in a column of the first subarray S1. In some embodiments, the reveal portion 18 of the jumper module 10 overlays the headlap portion 116 of the photovoltaic module 110a. In some embodiments, the reveal portion 18 of the jumper module 10 overlays a portion of the headlap portion 116 of the photovoltaic module 110a. In some embodiments, the reveal portion 18 of the jumper module 10 overlays the entirety of the headlap portion 116 of the photovoltaic module 110a. In some embodiments, the first side lap 22 of the jumper module 10 aligns with the first side lap 118 of the photovoltaic module 110a. In some embodiments, the first side lap 118 of an uppermost one of the photovoltaic modules 110*b* in a column of the second subarray S2 overlays the second side lap 24 of the jumper module 10. In some embodiments, the headlap portion 16 of the jumper module 10 is substantially aligned with the headlap portion 116 of the uppermost one of the photovoltaic modules 110*b* in a column of subarray S2. In some embodiments, the headlap portion 16 of the jumper module 10 is aligned with the headlap portion 116 of the uppermost one of the photovoltaic modules 110*b* in a column of subarray S2.

In some embodiments, the jumper module 10 electrically connects the first subarray S1 of the photovoltaic modules 110*a* with the second subarray S2 of the photovoltaic modules 110*b*. In some embodiments, the first junction box 26 of the jumper module 10 is electrically connected to the at least one electrical cable 66. In some embodiments, the first junction box 26 of the jumper module 10 is electrically connected to the electrical connector 72 of the at least one electrical cable 66. In some embodiments, the first junction box 26 of the jumper module 10 is electrically connected to the electrical connector 72 of the at least one electrical cable 66 by an electrical cable 130. In some embodiments, the first junction box 124 of the uppermost one of the photovoltaic modules 110*a* of the first subarray S1 is electrically connected to the second junction box 28 of the jumper module 10. In some embodiments, the first junction box 124 of the uppermost one of the photovoltaic modules 110*a* of the first subarray S1 is electrically connected to the second junction box 28 of the jumper module 10 by an electrical wire 132.

In some embodiments, the first junction box 124 of the uppermost one of the photovoltaic modules 110*b* of the subarray S2 is electrically connected to the at least one electrical cable 66. In some embodiments, the first junction box 124 of the uppermost one of the photovoltaic modules 110*b* of the subarray S2 is electrically connected to one of the electrical connector 74 of the at least one electrical cable 66. In some embodiments, the first junction box 124 of the uppermost one of the photovoltaic modules 110*b* of the subarray S2 is electrically connected to one of the electrical connector 74 of the at least one electrical cable 66 by an electrical wire 134.

In some embodiments, the second junction box 126 of the lowermost one of the photovoltaic modules 110*b* of the subarray S2 is electrically connected to the at least one electrical cable 66. In some embodiments, the second junction box 126 of the lowermost one of the photovoltaic modules 110*b* of the subarray S2 is electrically connected to another one of the electrical connector 74 of the at least one electrical cable 66. In some embodiments, the second junction box 126 of the lowermost one of the photovoltaic modules 110*b* of the subarray S2 is electrically connected to the another one of the electrical connector 74 of the at least one electrical cable 66 by an electrical wire 136.

In some embodiments, the second junction box 126 of the lowermost one of the photovoltaic modules 110*a* of the subarray S1 is electrically connected to an electronic component 150 of the structure including the roof deck 102. In some embodiments, the at least one electronic component includes at least one of an optimizer, a rapid shutdown device, or an inverter.

Figure 4A:
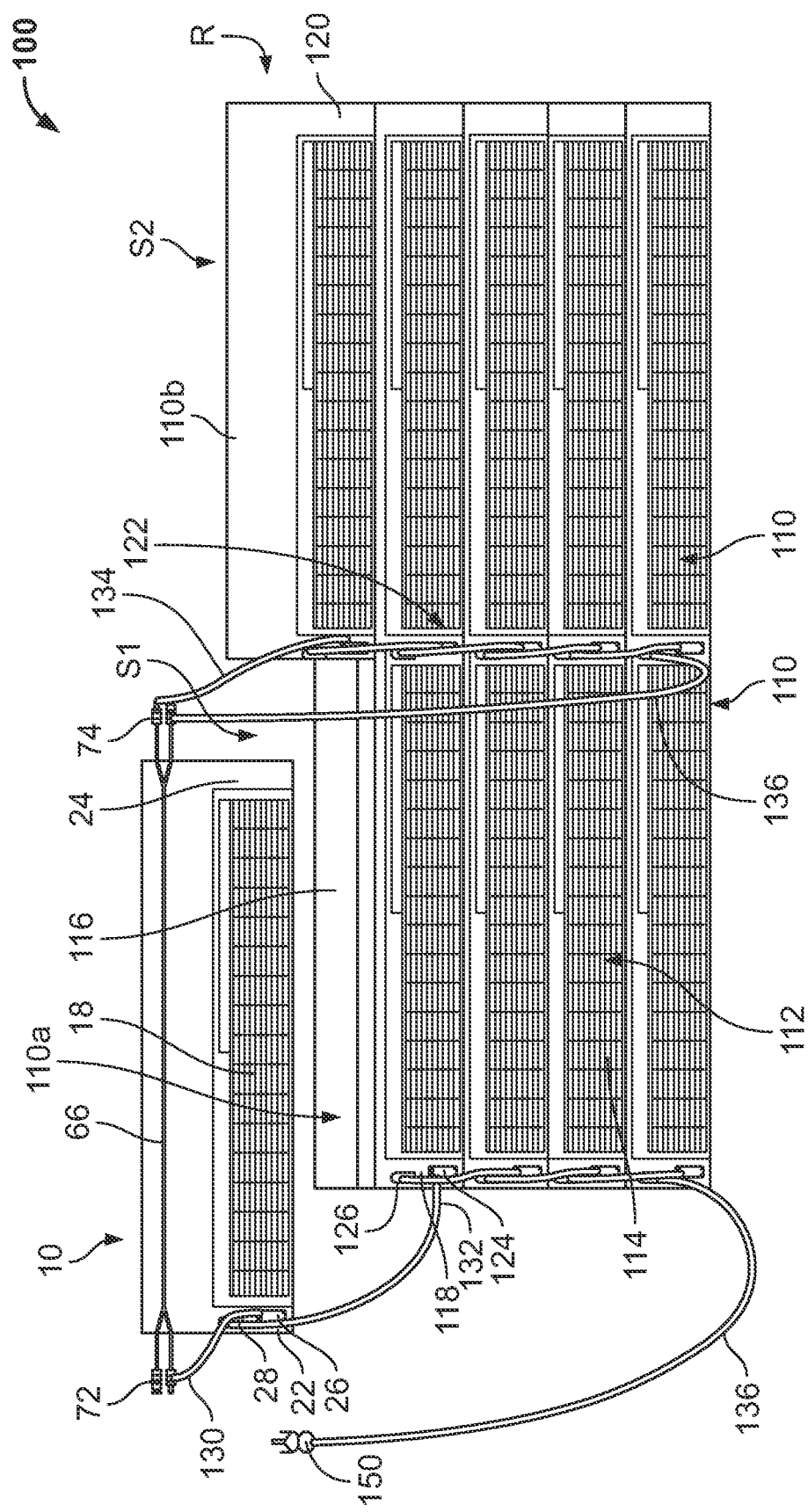
FIG. 4A is a top plan view of a photovoltaic system including the jumper module shown in FIG. 1.
Figure 4B:
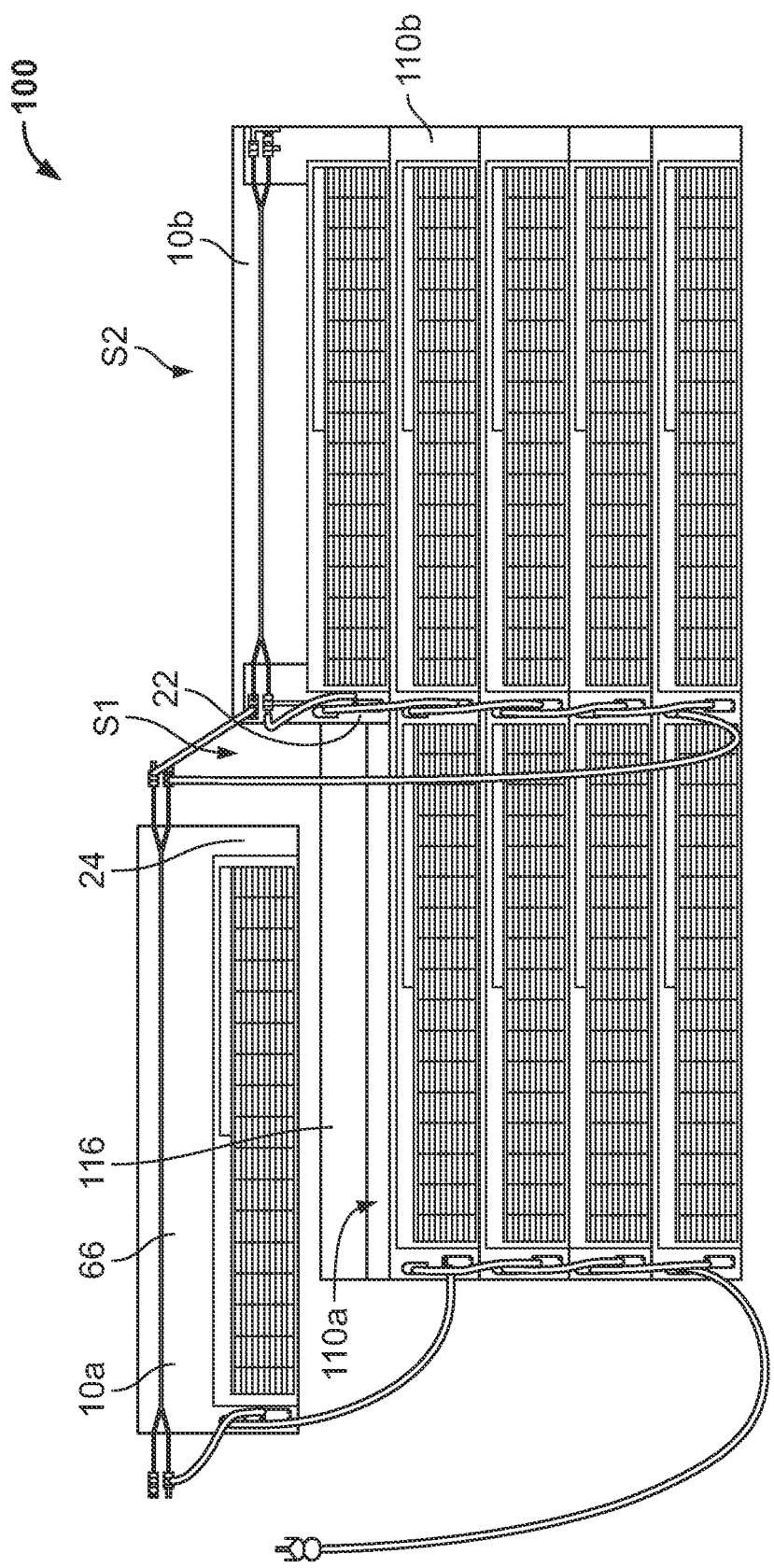
FIG. 4B is a top plan view of some embodiments of a photovoltaic system including a plurality of jumper modules shown in FIG. 1.
Figure 5:
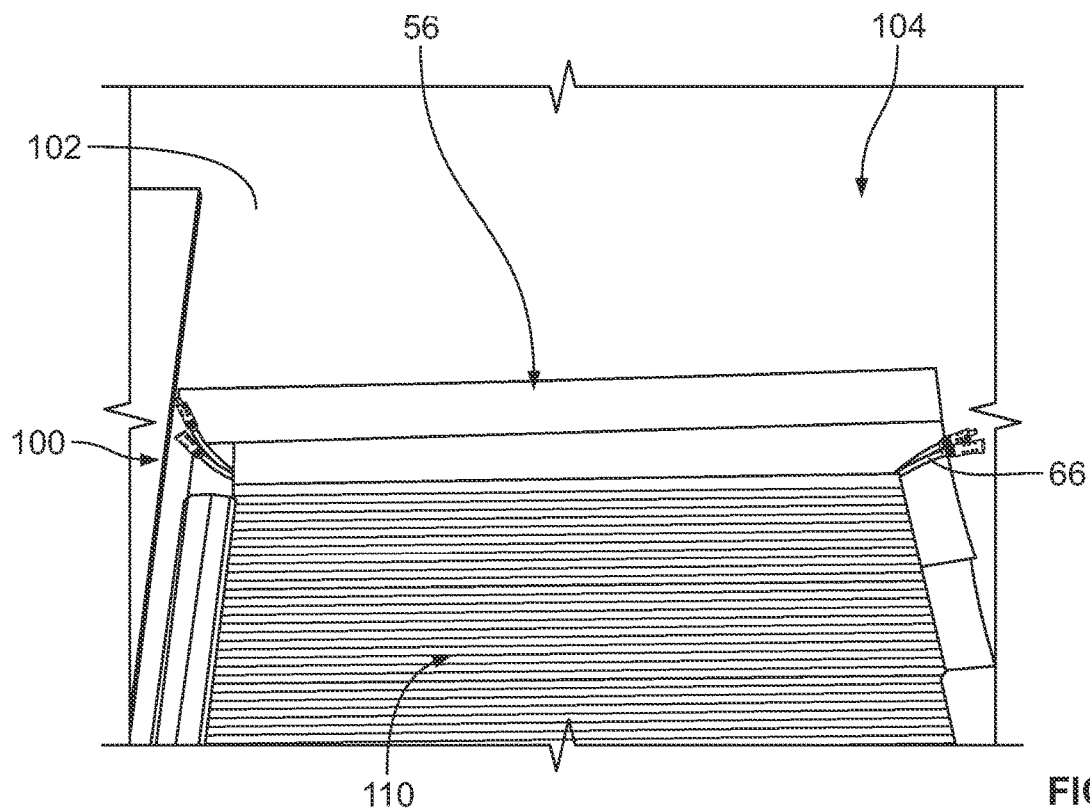
FIGS. 5 through 8 illustrate some embodiments of a jumper module for a photovoltaic system.
Figure 6:
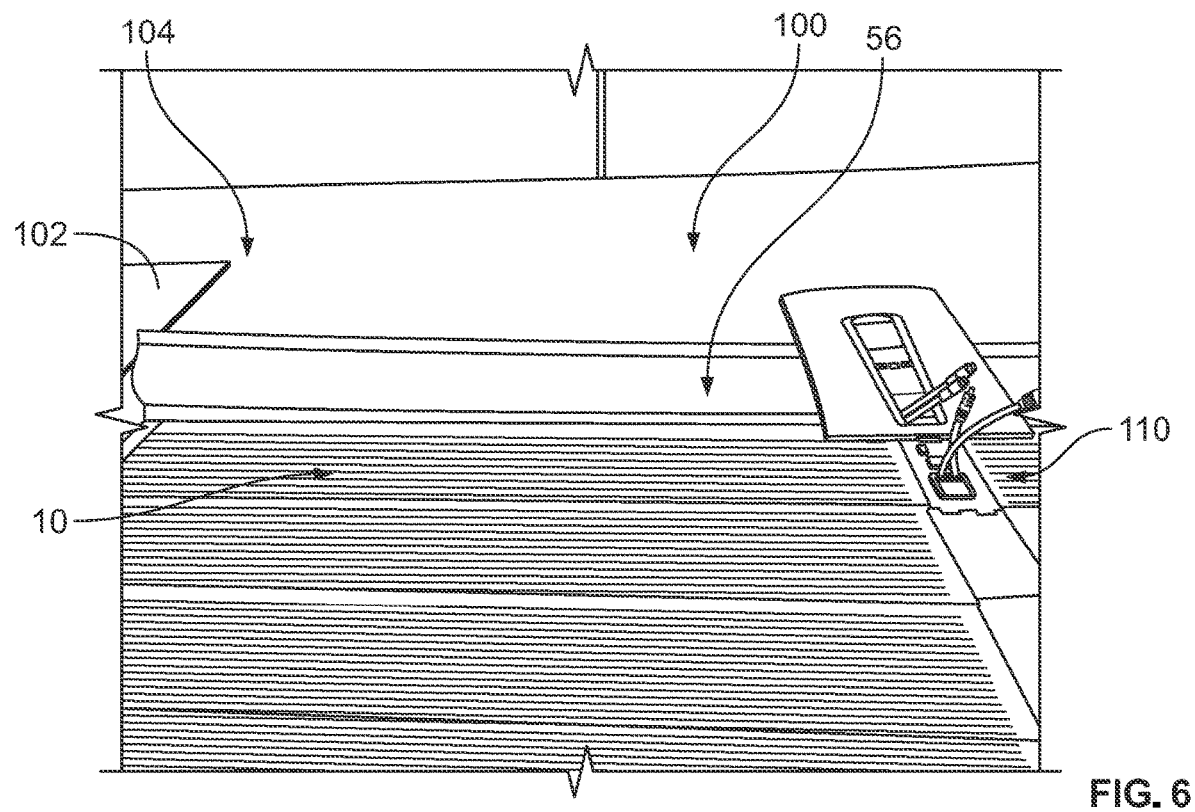
Figure 7:
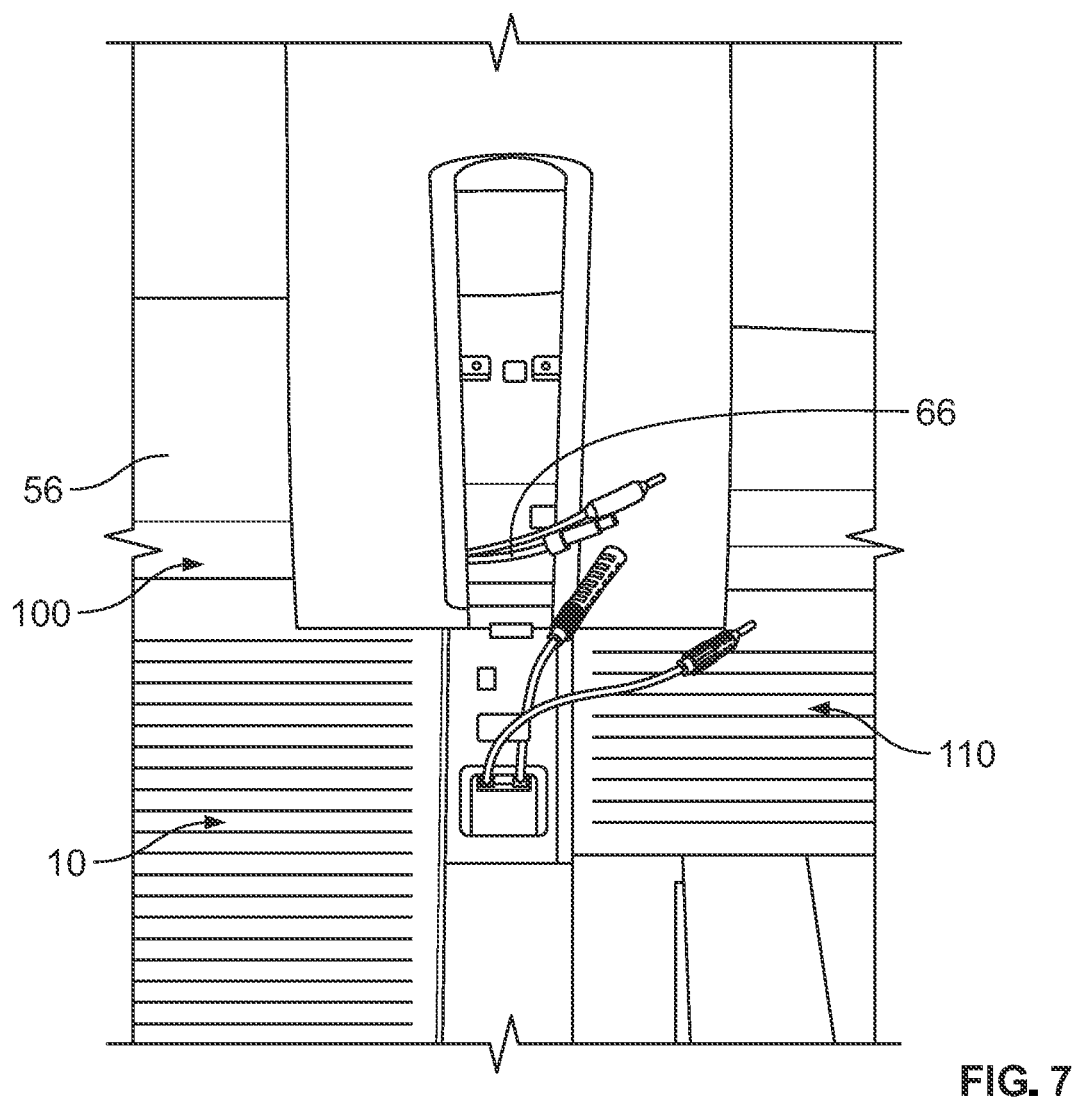
Figure 8:
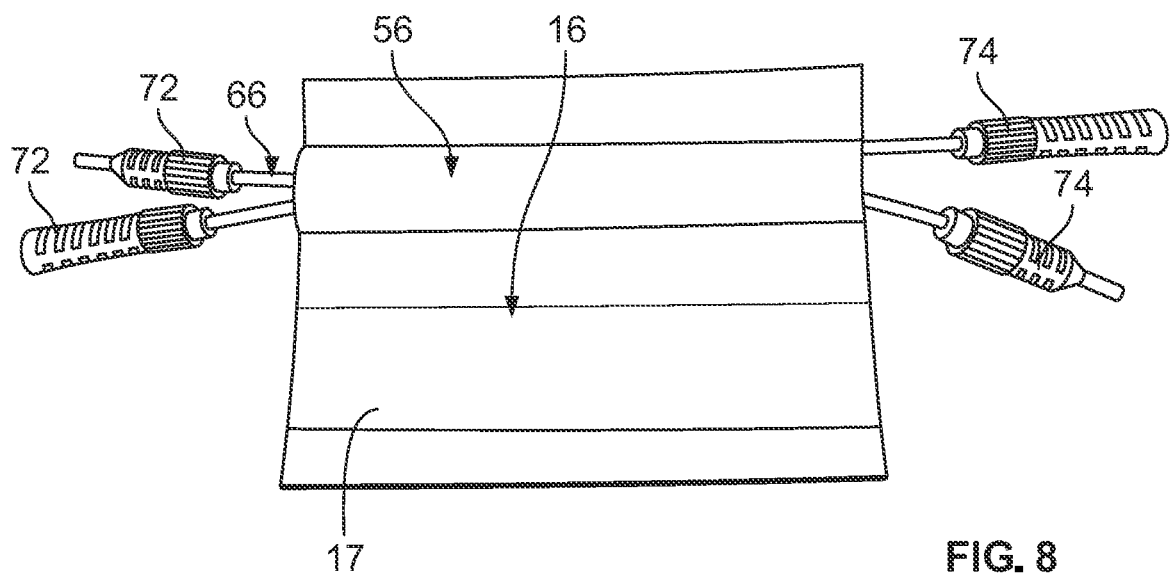

Referring to FIG. 4B, in some embodiments, the photovoltaic system 100 includes a plurality of jumper modules 10. In some embodiments, the uppermost module of the subarray S1 is a first one 10*a* of the jumper modules 10. In some embodiments, the uppermost module of the subarray S2 is a second one 10*b* of the jumper modules 10. In some embodiments, the first side lap 22 of the second one 10*b* of the jumper modules 10 overlaps the second side lap 24 of the first one 10*a* of the jumper modules 10. In some embodiments, the second one 10*b* of the jumper modules 10 is electrically connected to the at least one electrical cable 66 of the first one 10*a* of the jumper modules 10. In some embodiments, the second one 10*b* of the jumper modules 10 overlaps the headlap portion 116 of an uppermost one of the photovoltaic modules 110*b* of the second subarray S2.

Figure 10:
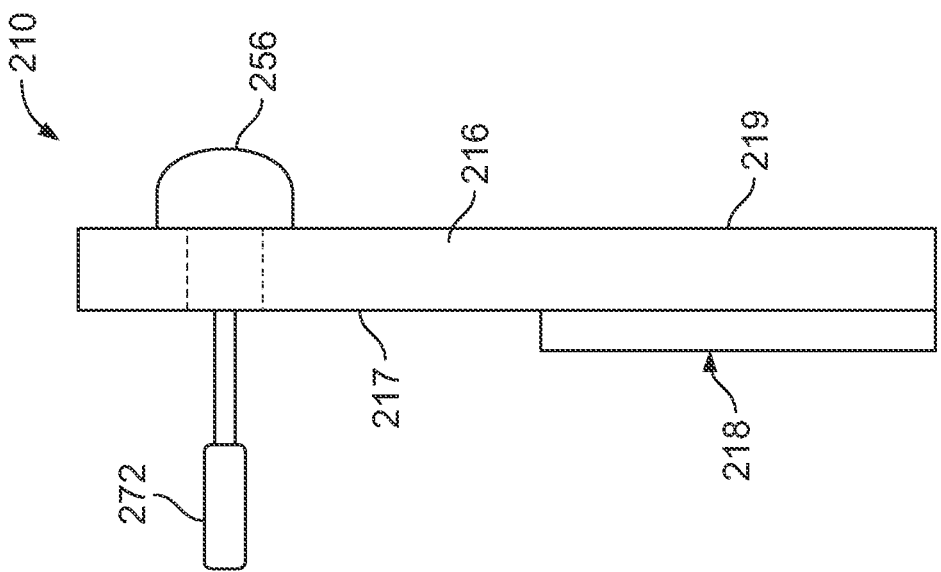
FIGS. 9 and 10 illustrate some embodiments of a jumper module for a photovoltaic system.
Figure 9:
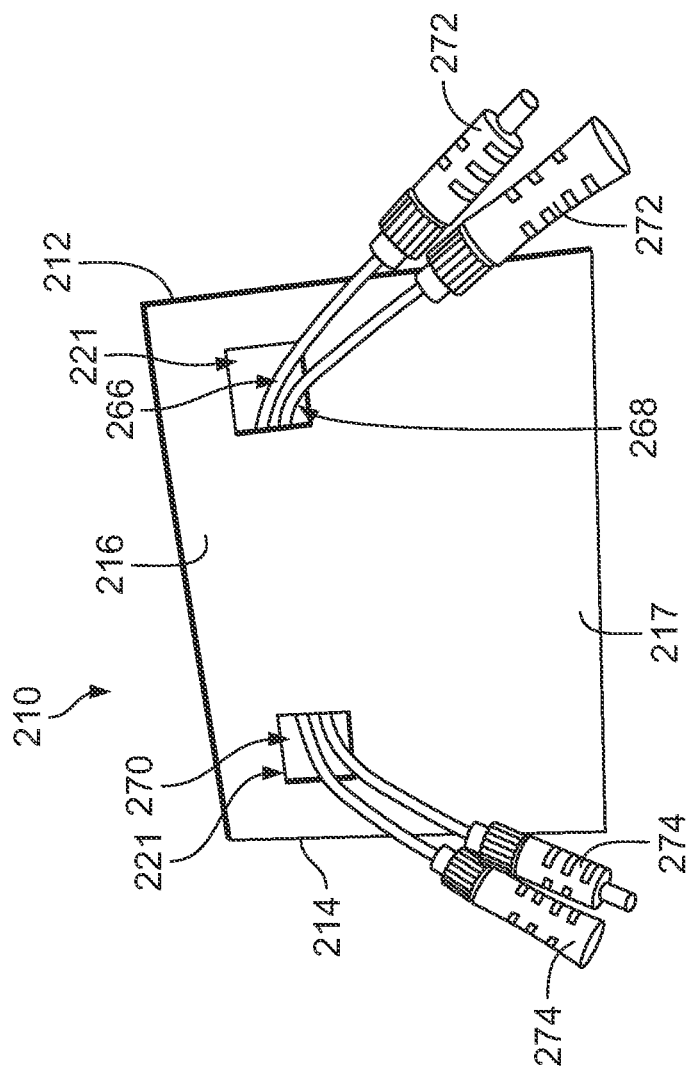

FIGS. 9 and 10 illustrate an embodiment of a jumper module 210. In some embodiments, the jumper module 210 has a structure and function similar to those of the jumper module 10 with certain differences. In some embodiments, the jumper module 210 includes a first end 212, a second end 214 opposite the first end 212, a headlap portion 216 extending from the first end 212 to the second end 214, and a reveal portion 218. In some embodiments, the headlap portion 216 includes a first surface 217 and a second surface 219 opposite the first surface 217. In some embodiments, the first surface 217 is a front surface of the jumper module 210. In some embodiments, the second surface 219 is a rear surface of the jumper module 210. In some embodiments, the jumper module 210 includes a sleeve 256. In some embodiments, the sleeve 256 is attached to the second surface 219. In some embodiments, a plurality of apertures 221 is located in the first surface 217. In some embodiments, one of the plurality of apertures 221 is located proximate to the first end 212 and another of the plurality of apertures 221 is located proximate to the second end 214.

In some embodiments, at least one electrical cable 266 is located within the sleeve 256. In some embodiments, a first end 268 of the at least one electrical cable 266 extends outwardly from one of the apertures 221. In some embodiments, a second end 270 of the at least one electrical cable 266 opposite the first end 268 extends outwardly from the another one of the apertures 221. In some embodiments, at least one electrical connector 272 is located at the first end 268. In some embodiments, at least one electrical connector 272 includes a plurality of the electrical connectors 272. In some embodiments, at least one electrical connector 274 is located at the second end 270. In some embodiments, at least one electrical connector 274 includes a plurality of the electrical connectors 274. In some embodiments, the plurality of apertures 221 is sealed. In some embodiments, the plurality of apertures 221 is sealed by a sealant. In some embodiments, the plurality of apertures 221 is sealed by grommets.

What is claimed is:

1. A system, comprising:
 a plurality of photovoltaic modules installed on a roof deck,
   wherein each of the plurality of photovoltaic modules includes
     a headlap portion, and
     a plurality of solar cells
   wherein the plurality of photovoltaic modules are arranged in an array on the roof deck,
   wherein the array includes a first subarray and a second subarray,
   wherein the first subarray includes a first plurality of the photovoltaic modules arranged in a first column comprising a first plurality of rows,
   wherein the second subarray includes a second plurality of the photovoltaic modules arranged in a second column comprising a second plurality of rows,
   wherein the first subarray is horizontally adjacent to the second subarray;
 at least one jumper module installed on the roof deck and electrically connecting the first subarray of the array and the second subarray of the array wherein the jumper module is structurally distinct from the plurality of photovoltaic modules,
wherein a first one of the at least one jumper module overlays the headlap portion of an uppermost one of the first plurality of photovoltaic modules,
wherein the at least one jumper module includes
an exterior surface,
a first end and a second end opposite the first end, and
a sleeve,
wherein the sleeve is on the exterior surface,
wherein the sleeve extends from the first end to the second end; and
at least one electrical cable,
wherein the sleeve is sized and shaped to receive the at least one electrical cable, and
wherein the at least one electrical cable electrically connects the first subarray to the second subarray, and
wherein the sleeve of the at least one jumper module is a separate component from the at least one cable.

2. The system of claim 1, wherein the at least one jumper module includes a headlap portion, wherein the headlap portion extends from the first end to the second end, and wherein the sleeve is attached to the headlap portion.

3. The system of claim 2, wherein the sleeve includes a tubular portion having an aperture, and wherein the aperture is sized and shaped to receive the at least one electrical cable.

4. The system of claim 2, wherein the at least one jumper module includes a first side lap located at the first end, and wherein the at least one jumper module includes a second side lap located at the second end.

5. The system of claim 4, wherein the at least one jumper module includes a first junction box located on the first side lap, wherein the first junction box is electrically connected to the at least one electrical cable.

6. The system of claim 5, wherein at least one of the plurality of photovoltaic modules of the first subarray includes a second junction box, wherein the second junction box is electrically connected to the first junction box.

7. The system of claim 6, wherein at least one of the plurality of photovoltaic modules of the second subarray includes a third junction box, wherein the third junction box is electrically connected to the first junction box by the at least one electrical cable.

8. The system of claim 7, wherein the at least one of the plurality of photovoltaic modules of the first subarray includes a first side lap, and wherein the first side lap of the one of the at least one jumper module is proximate to the first side lap of the at least one of the plurality of photovoltaic modules of the first subarray.

9. The system of claim 8, wherein the at least one of the plurality of photovoltaic modules of the first subarray includes a second side lap, and wherein the second side lap of the one of the at least one jumper module is proximate to the second side lap of the at least one of the plurality of photovoltaic modules of the first subarray.

10. The system of claim 7, wherein the at least one jumper module includes a plurality of jumper modules, and wherein the first side lap of another one of the plurality of jumper modules overlaps the second side lap of the one of the plurality of jumper modules.

11. The system of claim 10, wherein the first junction box of the another one of the plurality of jumper modules is electrically connected to the at least one electrical cable of the one of the plurality of jumper modules.

12. The system of claim 11, wherein the at least one electrical cable includes a first end, a second end opposite the first end of the at least one electrical cable, a first electrical connector at the first end of the at least one electrical cable, and a second electrical connector at the second end of the at least one electrical cable, wherein the first electrical connector extends from the sleeve at the first end of the at least one jumper module, and wherein the second electrical connector extends from the second end of the sleeve at the second end of the at least one jumper module.

13. The system of claim 12, wherein the first electrical connector is electrically connected to the first junction box and the second electrical connector is electrically connected to the third junction box.

14. The system of claim 11, wherein at least one of the plurality of photovoltaic modules of the second subarray includes a headlap portion, and wherein the another one of the plurality of jumper modules overlaps the headlap portion of the at least one of the plurality of photovoltaic modules of the second subarray.

15. The system of claim 2, wherein the at least one jumper module includes
at least one solar cell,
an encapsulant encapsulating the at least one solar cell,
wherein the encapsulant includes a first surface and a second surface opposite the first surface, and
a frontsheet juxtaposed with the first surface of the encapsulant,
wherein the frontsheet includes
a glass layer, and
a polymer layer attached to the glass layer, and
wherein the polymer layer forms an upper surface of the at least one jumper module.

16. The system of claim 15, wherein the at least one jumper module includes a backsheet juxtaposed with the second surface of the encapsulant, wherein the backsheet includes a first surface and a second surface opposite the first surface of the backsheet, and wherein the second surface of the backsheet forms a lower surface of the at least one jumper module.

17. The system of claim 16, wherein the backsheet forms the headlap portion, wherein the first surface of the headlap portion includes the exterior surface, and wherein the sleeve is attached to the first surface of the headlap portion.

18. The system of claim 16, wherein the backsheet forms the headlap portion, wherein the second surface of the headlap portion includes the exterior surface, and wherein the sleeve is attached to the second surface of the headlap portion.

* * * * *